United States Patent [19]

Yoshida

[11] 4,377,894
[45] Mar. 29, 1983

[54] METHOD OF LINING INNER WALL SURFACES OF HOLLOW ARTICLES

[75] Inventor: Toshio Yoshida, Kobe, Japan

[73] Assignee: Kawasaki Jukogyo Kabushiki Kaisha, Hyogo, Japan

[21] Appl. No.: 244,645

[22] Filed: Mar. 17, 1981

[30] Foreign Application Priority Data

Mar. 21, 1980 [JP] Japan ............................ 55-34698
May 1, 1980 [JP] Japan ............................ 55-57100

[51] Int. Cl.³ ............................................ B23P 17/00
[52] U.S. Cl. .................................. 29/421 R; 29/447; 29/454; 29/523; 138/140
[58] Field of Search ............... 29/447, 157.4, 523, 29/421 R, 454; 138/140

[56] References Cited

U.S. PATENT DOCUMENTS

| | | | |
|---|---|---|---|
| 1,955,728 | 4/1934 | Allen et al. | 29/447 |
| 1,980,156 | 11/1934 | Emrick | 29/447 |
| 2,337,247 | 12/1943 | Kepler | 29/421 R UX |
| 2,435,904 | 2/1948 | Robaus | 29/523 X |
| 2,444,192 | 6/1948 | Giesler | 29/454 |
| 2,695,446 | 11/1954 | Meyer | 29/523 |
| 2,986,847 | 6/1961 | Sato | 29/447 X |
| 3,064,344 | 11/1962 | Arne | 29/447 X |
| 3,068,562 | 12/1962 | Long | 29/421 R |

*Primary Examiner*—Charlie T. Moon
*Attorney, Agent, or Firm*—Wenderoth, Lind & Ponack

[57] ABSTRACT

The inner surface of a hollow article of special shape such as a pipe elbow or bellows is lined with a tightly fitted protective lining material by the steps of emplacing the lining material within the hollow article to confront the inner surface thereof, causing the temperature of the hollow article to be higher than that of the lining material, applying an expanding force to the lining material thereby to cause it to undergo plastic expansion together with the hollow article, removing the expanding force, and causing the temperature of the hollow structure to become lower than that of the lining material thereby to produce a tight fit therebetween due to interference.

8 Claims, 14 Drawing Figures

METHOD OF LINING INNER WALL SURFACES OF HOLLOW ARTICLES

BACKGROUND OF THE INVENTION

This invention relates generally to techniques of lining the inner wall surfaces of hollow articles of special shapes such as oil-well pipes, bellows, and pipe bends or elbows (hereinafter referred to as "hollow article(s)"). More particularly, the invention relates to the technique of lining a hollow article which comprises inserting an inner material for lining within the hollow article and causing the inner material to expand thereby to cause it to fit tightly against the inner wall surface of the hollow article.

As is known, piping for conducting fluids such as, for example, piping in plants, oil-well piping, and piping of heat exchangers are often required to convey corrosive fluids or the like. Furthermore, hollow articles such as high-temperature, high-pressure vessels must have not only strength to withstand pressure but also corrosion resistance and leakproofness, which are important design considerations.

In piping as mentioned above, it is necessary to positively provide and maintain resistance to withstand pressure and corrosion resistance not only in the general parts of the pipe structures but also in the special pipe parts of so-called oil-well pipes, tubing, bellows, and bends and pipe parts joined to flanges, panels, etc. In such piping, these required properties can be provided by properly installed linings. In a pressure vessel, also, a positively installed inner lining is required for imparting corrosion resistance and leakproofness thereto.

In cases where the conditions of flowing and retention of corrosive fluids as mentioned above involve various temperatures, pressures, chemical constituents, and the like, there is a high probability of trouble such as stress concentration, relative displacement, buckling, and fatigue failure due to differences in coefficients of thermal expansion between the inner and outer pipes and between pipes and panels joined thereto, and between other parts. In order to keep such trouble at a minimum, it is desirable to impart as large an interference as possible between the two members thereby to obtain strong bonding and integral state therebetween.

As methods of causing an inner lining material to adhere closely to the inner surface of a hollow article, in general, techniques such as shrink fitting, and hydraulic pipe expansion have heretofore been used. In shrink fitting, however, since temperature difference is utilized, only a light gap can be obtained at the boundary between the two members, whereby this technique is disadvantageous in that it cannot be utilized for articles such as bent pipes, bellows tubes, and oil-well pipes.

In hydraulic pipe expansion, in the case where the yield stress of the hollow tube is lower than that of the inner tube, for example, the interference becomes negative. Consequently, tightening becomes impossible even when pipe expansion is carried out, whereby there are imposed restrictions relative to mutual combinations, selection, etc. of the materials.

Furthermore, both of the above two methods have a drawback in that installation of an inner lining is impossible in the case of a hollow article such as pressure vessel because such a hollow article has a special structure different from that of an article such as a pipe structure.

SUMMARY OF THE INVENTION

It is an object of this invention to provide a method of providing a tightly fixed inner linings in hollow articles of the classes stated hereinabove in which method the above described difficulties encountered in the prior art are overcome.

According to this invention, briefly summarized, there is provided a method of lining the inner wall surface of a hollow article with an inner lining material, which comprises the steps of: emplacing the lining material within the hollow article to confront the inner surface thereof; causing the temperature of the hollow article to be higher than that of the lining material thereby to increase the gap therebetween either prior to or after the first mentioned step; applying an expanding force to the lining material thus emplaced thereby to cause the same to undergo plastic expansion deformation and to fit intimately against said inner surface; removing the expanding force when the lining material has reached a specific expanded size; and causing the temperature of the hollow structure to be lower than that of the lining material thereby to produce an even tighter fit between the hollow structure and the lining material due to interference.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
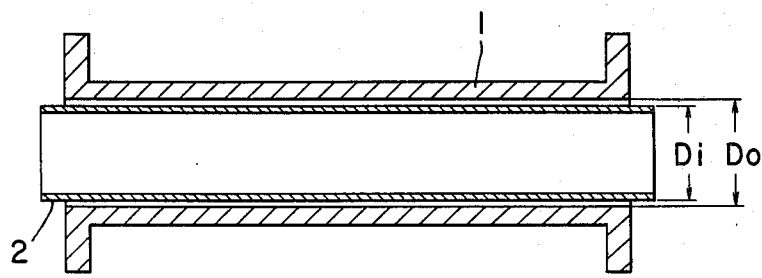
FIGS. 1, 2, 3, 4 and 5 are side views, in longitudinal section, for a description of one example of the process for installing an inner lining according to the invention, the views showing succeeding steps of the process.
Figure 2:
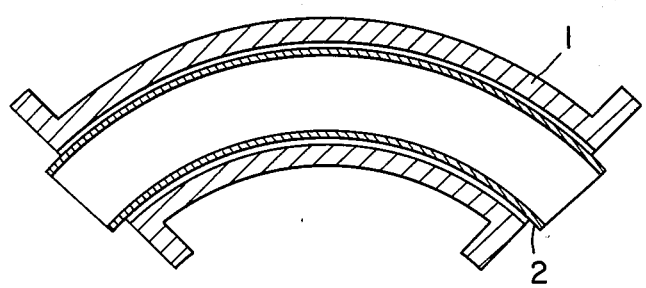

In a first embodiment of this invention as illustrated in FIGS. 1 through 5, the mode of lining the inner surface of a pipe bend or elbow is indicated. Into the hollow interior of a carbon-steel outer pipe 1 constituting a hollow article, a stainless-steel tube 2 constituting an inner lining material is inserted, the inner diameter $D_o$ of the outer pipe 1 being greater than the outer diameter $D_i$ of the inner tube 2 as shown in FIG. 1. Then, by means of a suitable pipe bending tool, the pipe 1 with the inner tube 2 inserted therein is bent into a required shape as shown in FIG. 2. It is to be understood that, in the following description of the expansions and contractions of the outer pipe 1 and the inner tube 2 with reference to FIG. 6, their behavior or variation of their diameters means variation of their inner diameter and outer diameter, respectively, although these diameters may not be explicitly mentioned.

Figure 3:
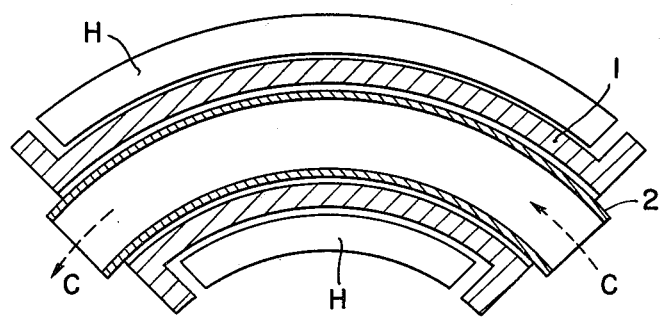
Figure 6:
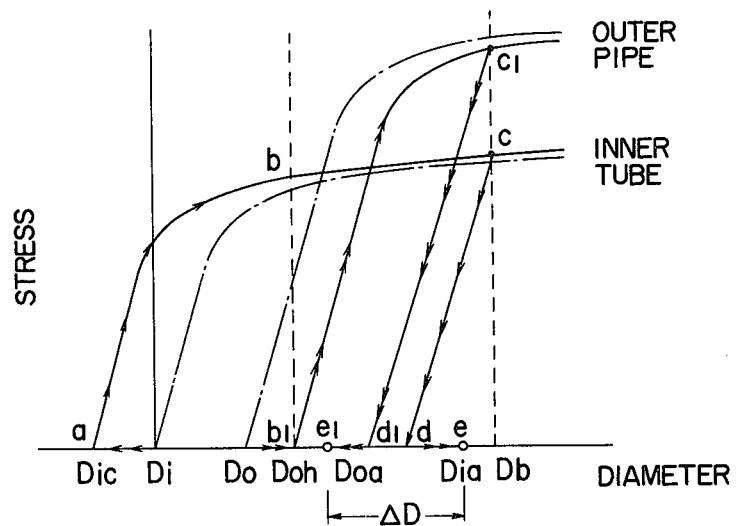
FIG. 6 is a graph indicating relationships between diameters of inner and outer tubes and stress.

Then, with the two members 1 and 2 in the above described state, the outer surface of the outer pipe 1 is heated by heating means H as shown in FIG. 3, such as a suitable coil heater or microwave heater. At the same time, a coolant such as chilled water is passed through the interior of the inner tube 2 as indicated by arrows C in FIG. 3 thereby to cool the inner tube 2. By this heating and cooling, the outer pipe 1 and the inner tube 2 are caused to expand and contract, respectively, from their initial diameters $D_o$ and $D_i$ to diameters $D_{oh}$ and $D_{ic}$ as indicated in FIG. 6.

Figure 4:
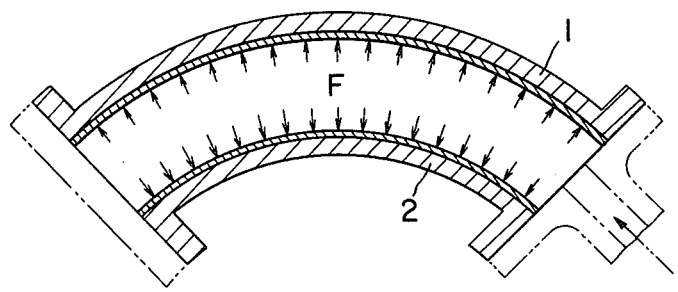

After the diameters have been caused to change as described above, the heating and cooling are stopped, and, by utilizing the cooling water in the inner tube 2, hydraulic pressure is applied to the interior thereof by closing the two open ends of the tube 2 as indicated by chain lines in FIG. 4, thereby imparting a tube expanding force F as indicated in this figure. Thus, the inner tube 2 is first expanded in a path a-b-c along its stress-strain curve shown in FIG. 6. Then, when the outer diameter of the inner tube 2 reaches the inner diameter $D_{oh}$ of the outer pipe 1, the outer surface of the inner tube 2 contacts the inner surface of the outer pipe 1. Thereafter, the two members 1 and 2 are expanded as an integral structure in superimposed state, and the diameter of the outer pipe 1 traces the curve $b_1$-$c_1$ in accordance with the difference in the yield stresses. At the beginning of this expansion, the inner tube 2 is already plastically expanded (deformed) and has acquired a permanent set, while the outer pipe 1 first undergoes elastic deformation. Then, as this expansion progresses, the outer pipe 1 also is plastically expanded, that is, also acquires a permanent set.

Then, when the pipe diameters reach a specific diameter $D_B$, the pipe expanding force F is removed, whereupon, the diameter of the outer pipe 1 contracts from $c_1$ to $d_1$, while the diameter of the inner tube 2 contracts from c to d. These diameters $d_1$ and d are diameters which the outer pipe 1 and the inner tube 1 would assume in a free state.

Figure 5:
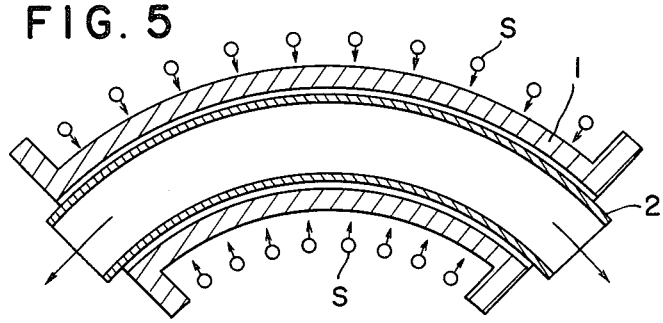

Consequently, under these conditions, the outer pipe diameter at $d_1$ is less than the inner tube diameter at d, and a tightening force due to interference acts between the members as long as this state is maintained. However, if the cooling water in a still cold state in the inner tube 2 is drained out, and, at the same time, cooling water jets are sprayed from water spraying means S onto the outer surface of the outer pipe 1 as indicated in FIG. 5, the temperature of the inner tube 2 will rise, and, conversely, the outer pipe 1 will be cooled.

As a consequence, the inner tube tries to expand from d to e and be increased in diameter to $D_{ia}$. On the other hand, the outer pipe 1 tries to contracts from $d_1$ to $e_1$ and be decreased in diameter to $D_{oa}$. These diameters are those which their respective members would actually assume in the free state. As a result, the difference or interference between these diameters becomes $D_{Ia} - D_{oa} = \Delta D$, which is considerably large, whereby the fit between the outer pipe 1 and the inner tube 2 becomes very tight and positive. The lining process is thus completed.

While, in the above described example, the outer pipe 1 is heated and the inner tube 2 is cooled after the inner tube has been inserted in the outer pipe, the temperatures of these members may be thus varied prior to the insertion of the inner tube, or either the heating only or the cooling only may, of course, be carried out. This procedure is applicable also in the case where the yield point of the outer pipe is lower than that of the inner tube, and the pipe expanding force and the heating and cooling means are within the purview of design.

It is to be understood that the expansions of the inner lining material and of the hollow structure are, of course, carried out in a manner such that the breaking stresses of these members are not reached.

Figure 7:
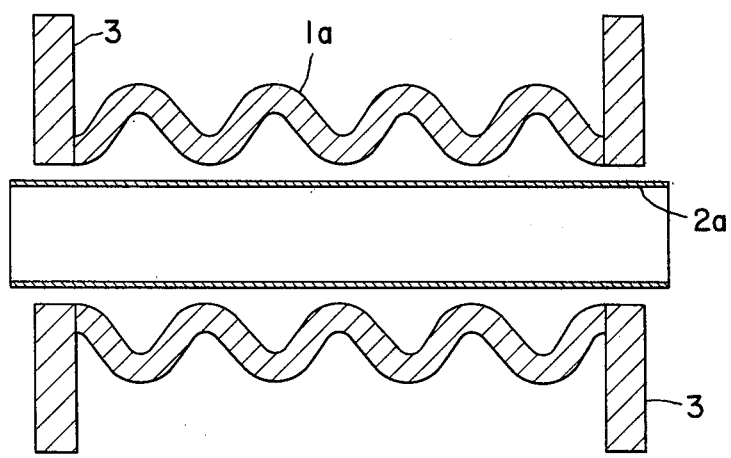
FIGS. 7 and 8 are side views, in longitudinal section, indicating another example of the process for installing an inner lining in a bellows pipe according to the invention.
Figure 8:
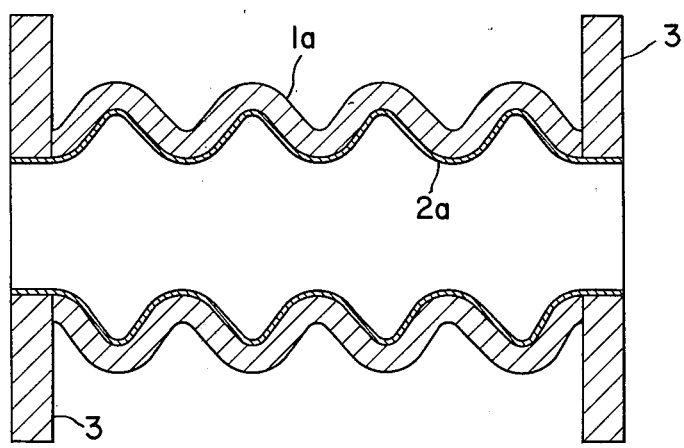

In another embodiment of the invention as shown in FIGS. 7 and 8, the lining method is applied to a bellows coupling for a flexible joint. This coupling comprises a bellows pipe structure 1a and flanges 3 welded integrally to the ends of the bellows pipe 1a. The inner wall surface of this bellows coupling, including that of the flanges 3 is to be lined with an inner lining material, which in this case is an inner tube 2a.

This inner tube 2a, which is initially a substantially straight and cylindrical tube, as shown in FIG. 7, is inserted into the bellows coupling. Then, similarly as in the preceding example, the process of heating the outer pipe 1a to enlarge its diameter, cooling the inner tube 2a to decrease its diameter, applying hydraulic pressure to the interior of the inner tube 2a, causing deformation by utilizing the difference between the yield stresses, removing the tube-pipe expanding force at a specific deformation, causing contraction, and then raising the temperature of the inner tube to increase its diameter while cooling the outer pipe to decrease its diameter thereby to produce a large mutual difference in diameters and to obtain a very tight fit is carried out. As a result, an inner lining 2a tightly and intimately fitted against the inner wall surface of the bellows coupling as shown in FIG. 8 is obtained.

In the instant example, also, similarly as in the preceding example, the selection of the heating and cooling steps prior to or after insertion of the inner tube 2a into the bellows coupling 1a, 3, the selection of either one step, the selection of the cooling and heating steps after removal of the pipe-tube expanding force, the selection of the combination with the heating and cooling prior to pipe-tube expansion, and like features of the process can be freely made.

Furthermore, this process is applicable, of course, also to the case where the yield point of the bellows pipe 1a is lower than that of the inner tube 2a.

Figure 9:
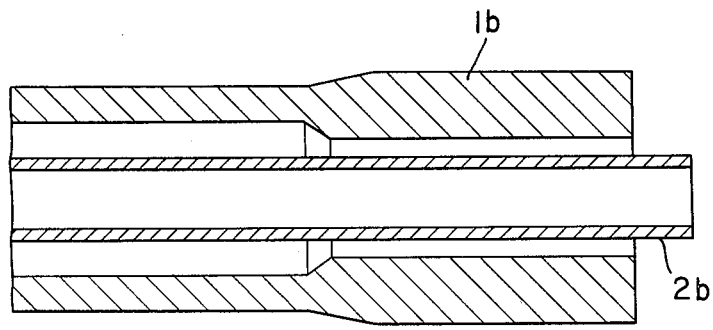
FIGS. 9 and 10 are fragmentary side views, in longitudinal section, showing still another example of the process for installing an inner lining in an oilwell tube according to the invention.
Figure 10:
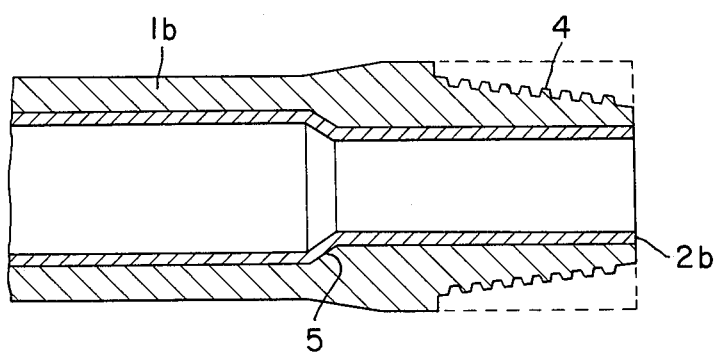

In still another embodiment of this invention as illustrated in FIGS. 9 and 10, the lining method is applied to oil-well tubing. As shown in FIG. 9, a straight cylindrical tube 2b to serve as the inner lining material is inserted into the oil-well tubing 1b of a specific shape in longitudinal section, and relative diameter variations and caused by heating the outer tubing 1b and cooling the inner tubing 2b. Thereafter, the tubings are expanded. After the tube expanding force is removed, the tubes are contracted, and the outer tube 1b is cooled while the temperature of the inner tubing 2b is raised. As a result, a tight fitting between the outer tubing 1b and the inner lining 2b as shown in FIG. 10 is obtained in spite of the existence of a stepped part 5 in the inner wall surface of the outer tubing 1b.

Thereafter, joint threads 4 as required are formed by machining as shown in FIG. 10.

Similarly as in the preceding example relating to a bellows coupling, cooling and heating can be carried out either prior to or after tube expanding.

Figure 11:
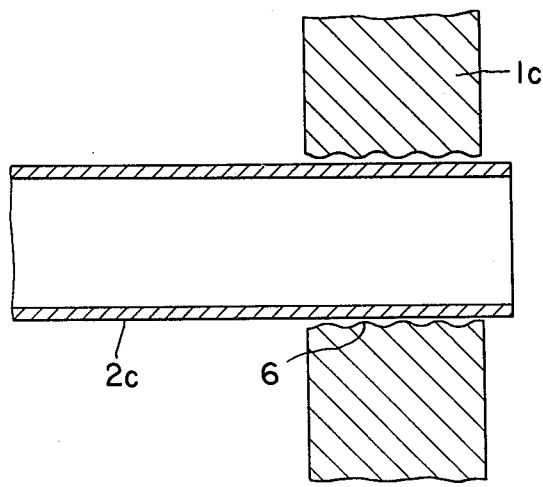
FIGS. 11 and 12 are side views, in longitudinal section, showing an example of a process for fixing an end of a tube to a plate, such as a tube sheet, according to the invention.
Figure 12:
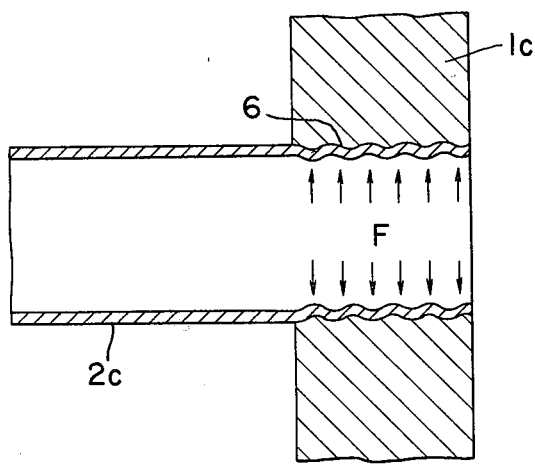

In a further embodiment of this invention as illustrated in FIGS. 11 and 12, the lining method is applied to the fixing of an end of a tube 2c to a plate member 1c, through which the tube end is passed, as in a heat exchanger for a nuclear reactor, for example, in which tubes are thus affixed to tube sheets. In this example, the plate member 1c constitutes the hollow article, and its wall surface at its hole through which the tube end is passed is provided with corrugations in the axial direction of the hole. Only the end portion of the tube 2c is involved in this joining of the tube 2c and the plate 1c along the joint part 6. This application of the method of this invention is very effective in obtaining a tight connection and is advantageous in forming this kind of joint along the joint part 6 of the two members, which is extremely difficult or impossible by other known methods such as welding.

In making this joint, the joint portion of the tube 2c is cooled to a specific temperature and smoothly inserted into the hole in the plate 1c. Then, by applying hydraulic pressure to the interior of the tube 2c, a tube expanding force F is applied thereto. The tube 2c is thereby expanded until it contacts the wall surface of the hole in the plate 1c at 6. Then, as the tube 2c is further expanded, it exerts a compressive stress on the plate 1c, thereby increasing the diameter of its hole. Then, after a specific deformation has been obtained, the tube expanding force F is removed, whereupon both members undergo a contraction in diameter. The diameter of the tube 2c is then increased thereby to increase the relative negative difference in diameters, whereby a tight and positive joint is established between the tube 2c and the plate 1c.

It will be obvious that, in the instant example, it is possible to heat the plate 1c prior to insertion thereinto of the tube 2c and to cool it after expansion of the tube 2c, in which case, the effectiveness of the technique will be further enhanced.

Figures 13, 14:
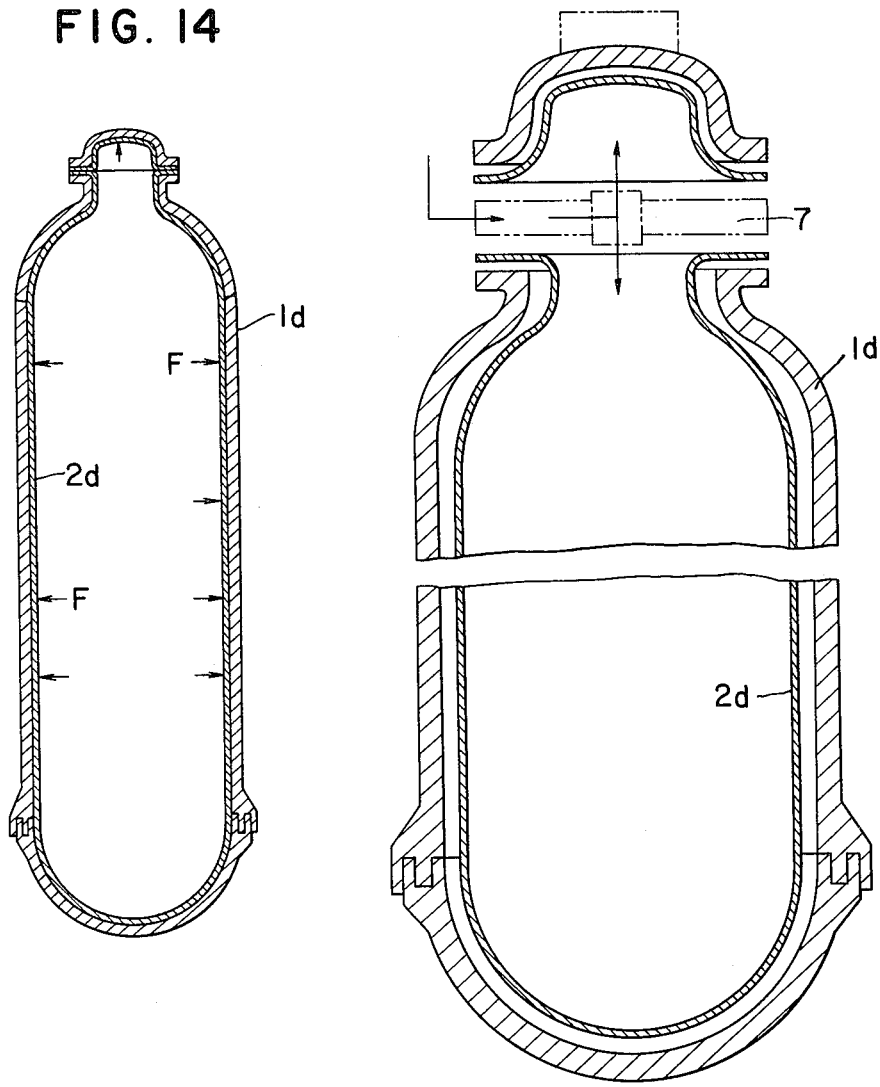
FIGS. 13 and 14 are side views, in longitudinal section, showing an additional example of the process for installing an inner lining in a pressure vessel according to the invention.

In a still further embodiment as shown in FIGS. 13 and 14, the method of this invention is applied to provide an inner lining of a pressure vessel to be at high internal temperature and pressure. The hollow article in this case is the outer shell 1d of a pressure vessel of a urea reaction column and is made of carbon steel of high tensile strength. The inner lining material 2d is made of stainless steel. Because the volume of a reaction column of this kind is large and because of restrictions imposed by its shape, methods such as welding of joining the lining material 2d to the shell 1d cannot be resorted to. Accordingly, the application of the technique of this invention is very effective.

In carrying out this lining operation, the inner lining material 2d is fabricated by welding into a suitable shape and size for the shell 1d, which is then assembled and secured so as to enclose the lining material 2d. Cooling water is introduced by way of a suitable sealing and water-introducing means 7 into the lining material 2d. At the same time, hot air is blown against the outer surface of the shell 1d thereby to increase the gap between the two structures 1d and 2d.

Then a pressure F is applied to the cooling water within the lining material 2d, which is thereby expanded and is pressed into intimate contact with the inner surface of the shell 1d. The lining material 2d, together with the shell 1d, is further expanded, and thereafter the pressure F is removed. The cooling water is discharged, and the lining material 2d is returned to room temperature. On one hand, the heating of the shell 1d is stopped, and the shell is caused to be naturally cooled, whereby a tight fit as indicated in FIG. 14 is obtained.

By suitable design of the two members of a pressure vessel as described above, the shell 1d can be caused to have ample strength to withstand operational pressures in use, while the lining material 2d can be caused to satisfy requirements such as those for corrosion resistance and leakproofness.

This invention in its mode of practice as described above is applicable also to the installation of the inner lining of pressure tanks for storing liquefied gases at very low temperatures.

It is to be understood that the modes of practice of the lining method of this invention are not limited to those exemplified by the above described embodiments of the invention but include various other applications to industrial equipment and piping requiring inner linings.

As described above, in the practice of this invention, heating of the hollow article and cooling of the inner lining material are selectively carried out prior to or after the fitting of the inner lining material against the inner surface of the hollow article, and the lining material is plastically expanded and, integrally together with the hollow article, is deformed, after which the expanding force is removed. As a result, the hollow article produces a negative contraction relative to the lining material at the time of contraction thereof and is capable of producing primarily an interference resulting in tightening. In addition, after contraction, the hollow article and lining material are further caused to undergo independently thermal contraction and thermal expansion, whereby a relative negative contraction is imparted in a secondary manner. As a result, an ample interference is produced, and a tight fit is positively obtained with respect to even hollow articles which hitherto could not be easily lined internally by conventional methods.

Furthermore, by the method of this invention, tight fits can be positively obtained even in cases of combinations of materials wherein the yield points of the hollow articles are lower than those of their respective lining materials. Accordingly, irrespective of the selection of constitutent materials of industrial equipment, piping, etc., tightly fitting inner linings are obtainable in various hollow articles, and failures such as buckling and fatigue failures under severe conditions of operational pressure and temperature and in the presence of corrosive fluids are prevented.

Still another merit of the invention, as mentioned hereinbefore, is that there is a broad range of choices of the fitting process because, depending on the heating temperature and the cooling conditions, these steps can be carried out prior to or after expansion.

In addition, the work of installing the lining is facilitated by the freedom of selection of the gap between the mating parts.

What is claimed is:

1. A method of lining the inner wall surface of a hollow article with an inner lining material, which comprises: a step (a) of emplacing the lining material within the hollow article to confront the inner surface thereof; a step (b) of causing the temperature of the hollow article to be higher than that of the lining material thereby to increase the gap therebetween either prior to or after the step (a); a step (c) of applying an expanding force to the lining material thus emplaced thereby to cause the same to undergo plastic expansion deformation and to fit intimately against said inner surface; and thereafter a step (d) of causing the temperature of the hollow structure to become lower than that of the lining material thereby to produce an even tighter fit between the hollow structure and the lining material due to interference.

2. A method as claimed in claim 1 further comprising a step (e) of removing the expanding force of the step (c) when the lining material has reached a specific expanded size, the step (e) being carried out between the steps (c) and (d).

3. A method as claimed in claim 2 in which the hollow structure is an outer pipe, and the inner lining material is an inner tube, the outer pipe and the inner tube being originally of straight tubular form, and which further comprises a step (f) of bending the outer pipe and the inner tube emplaced therein into a bend or elbow, the step (f) being carried out after the step (a).

4. A method as claimed in claim 2 in which the hollow structure is a bellows pipe structure, and the inner lining material is an inner tube, which is originally a straight tube but is finally of corrugated shape, tightly and intimately fitted against the inner surface of the bellows pipe structure after the step (d).

5. A method as claimed in claim 2 in which the hollow structure is an oil-well tubing of reduced inner diameter at the ends thereof, and the inner lining material is an inner tubing, which is originally a straight tube of constant inner and outer diameters but is finally a lining tube tightly and intimately fitted against the inner surface of the oil-well tubing after the step (d).

6. A method as claimed in claim 2 in which the hollow structure is a plate wall member having a through hole, and the inner lining material is at an end part of a tube, which end part is tightly and intimately fixed against the wall surface of said through hole after the step (d).

7. A method as claimed in claim 2 in which the hollow structure is the outer shell of a pressure vessel, and the inner lining material is a lining vessel structure originally conforming substantially to the inner surface of the outer shell, which is assembled around the lining vessel structure in the step (a).

8. A method as claimed in any of claims 1 through 7 in which the inner lining material is selected to protect the hollow structure against harmful effects of fluids to flow therethrough or be contained therein.

* * * * *